(12) United States Patent
Schepis et al.

(10) Patent No.: US 9,495,547 B1
(45) Date of Patent: Nov. 15, 2016

(54) SYSTEMS AND METHODS FOR APPLYING PARENTAL-CONTROL APPROVAL DECISIONS TO USER-GENERATED CONTENT

(75) Inventors: Adam Schepis, Milford, MA (US);
Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 1568 days.

(21) Appl. No.: 12/607,466

(22) Filed: Oct. 28, 2009

(51) Int. Cl.
*G06F 15/16* (2006.01)
*H04M 1/66* (2006.01)
*G06F 7/04* (2006.01)
*G06F 3/00* (2006.01)
*G06F 9/00* (2006.01)
*A63F 9/24* (2006.01)
*G06F 15/173* (2006.01)
*G06F 21/60* (2013.01)
*H04L 12/58* (2006.01)

(52) U.S. Cl.
CPC ............ *G06F 21/604* (2013.01); *H04L 51/12* (2013.01)

(58) Field of Classification Search
CPC ................... G06F 2221/2149; G06F 21/604; H04L 51/12

USPC ....................................................... 709/218
See application file for complete search history.

(56) References Cited

U.S. PATENT DOCUMENTS

| | | | |
|---|---|---|---|
| 7,869,790 B2 * | 1/2011 | Singh et al. ................. 455/411 |
| 2005/0114338 A1 * | 5/2005 | Borthakur et al. ............... 707/9 |
| 2008/0282338 A1 * | 11/2008 | Beer ............................... 726/12 |
| 2009/0006582 A1 * | 1/2009 | Daswani et al. ............. 709/219 |
| 2009/0042654 A1 * | 2/2009 | Barber ............................ 463/42 |
| 2009/0077673 A1 * | 3/2009 | Schmelzer ..................... 726/30 |
| 2009/0113519 A1 * | 4/2009 | Evans et al. ..................... 726/1 |
| 2009/0307602 A1 * | 12/2009 | Brewer et al. ................ 715/744 |
| 2010/0186885 A1 * | 7/2010 | Ottleben ....................... 156/242 |

* cited by examiner

*Primary Examiner* — Phuoc Nguyen
*Assistant Examiner* — Kishin G Belani
(74) *Attorney, Agent, or Firm* — ALG Intellectual Property, LLC

(57) ABSTRACT

A computer-implemented method for applying parental-approval decisions to user-generated content. The method may include receiving, from a child, a request to upload user-generated content to the Internet. The method may also include providing the user-generated content to a guardian of the child and receiving, from the guardian of the child, a decision indicating whether the user-generated content is allowed to be uploaded to the Internet. The method may further include applying the decision of the guardian to the user-generated content. Various other methods, systems, and computer-readable media are also disclosed.

19 Claims, 7 Drawing Sheets

SYSTEMS AND METHODS FOR APPLYING PARENTAL-CONTROL APPROVAL DECISIONS TO USER-GENERATED CONTENT

BACKGROUND

Children increasingly access the Internet in their everyday activities and may access a variety of content from the Internet. A parent or an organization may deem some content inappropriate for a child and may wish to prevent that child from accessing such content.

If a parent deems Internet content inappropriate, the parent may use parental-control software to block a child from accessing the content. The parent may use the parental-control software to block access to a website with inappropriate content. However, blocking an entire website may be too coarse of a remedy in many cases. For example, an increasing amount of Internet content may be user-generated (e.g., blogs and social networking content). A website that hosts user-generated content may include both appropriate and inappropriate content.

Some parental-control software may help parents automatically block content on a case-by-case basis by scanning for keywords that signal inappropriate content. However, relying on keywords may produce too many false positives and too many false negatives. For example, a keyword that tends to signal inappropriate content may also have benign uses. Further, some inappropriate content may not include keywords that are helpful for identifying the content.

Websites that host user-generated content may pose a further difficulty for parents who wish to prevent their children from submitting inappropriate content. User-generated content is typically sent in a format (e.g., an image format, a movie format, etc.) that is difficult for computers to scan automatically. Furthermore, defining and maintaining parental-control policies for user-generated content may be prohibitively cumbersome. What is needed, therefore, is a more efficient and effective mechanism for applying parental controls to user-generated content of children.

SUMMARY

As will be described in greater detail below, the instant disclosure generally relates to systems and methods for applying parental-approval decisions to user-generated content. Embodiments of the instant disclosure provide various workflows for parents to approve user-generated content of children. For example, a method for applying parental-approval decisions to user-generated content may include 1) receiving, from a child, a request to upload user-generated content to the Internet, 2) providing the user-generated content to a guardian of the child, 3) receiving, from the guardian of the child, a decision indicating whether the user-generated content is allowed to be uploaded to the Internet, and 4) applying the decision of the guardian to the user-generated content.

The method for applying parental-approval decisions to user-generated content may be performed in a variety of contexts. For example, a child may request pre-authorization for user-generated content before attempting to upload the user-generated content. As another example, the request to approve user-generated content may be automatically generated when a child attempts to upload user-generated content that has not previously been approved. In such embodiments, the method may include capturing transaction information associated with the attempt to upload user-generated content to the website, associating the transaction information with the attempt to upload user-generated content to the website, and applying the decision of the guardian by replaying the transaction information to cause the user-generated content to be uploaded to the website in situations where the decision of the guardian indicates that the user-generated content is allowed to be uploaded.

Replaying the transaction information may include using the transaction information to identify the website, identifying an upload script associated with the website, and executing the upload script. The upload script may facilitate upload of the user-generated content. In some embodiments, the child may be prompted to initiate the upload script, and the upload script may guide the child through a process of uploading the user-generated content.

In certain embodiments, providing the user-generated content to a guardian of the child may include adding the user-generated content to a queue of user-generated content to be reviewed by the guardian of the child and notifying the guardian that the user-generated content has been added to the queue.

The decision of the guardian may be applied to the user-generated content in a variety of contexts. For example, the decision may be applied to the user-generated content by notifying the child of the decision. Additionally or alternatively, if the user-generated content is not allowed to be uploaded to the Internet, the decision of the guardian may be applied to the user-generated content by detecting an attempt to upload the user-generated content to a website and blocking the attempt to upload the user-generated content. If the decision of the guardian indicates that the user-generated content is allowed to be uploaded to the Internet, applying the decision of the guardian may include detecting an attempt to upload the user-generated content to a website and allowing the user-generated content to be uploaded to the website.

In some embodiments, applying the decision of the guardian may include detecting an attempt to upload the user-generated content to a website, identifying the website on a list of restricted websites, and determining that content cannot be uploaded to the website without approval of the guardian. Additionally or alternatively, applying the decision of the guardian may include detecting an attempt to upload the user-generated content to a website and determining that the user-generated content includes a type of content that is prohibited from being uploaded to the Internet without approval. In various embodiments, applying the decision of the guardian may include 1) associating the decision of the guardian with a hash of the user-generated content and a filename of the user-generated content, where the decision indicates that the user-generated content is approved for upload to the Internet, 2) detecting an attempt to upload new content to a website, 3) determining that the content has the same filename as the user-generated content approved for upload to the Internet, 4) determining that a hash of the new content does not match the hash of the user-generated content approved by the guardian, and 5) blocking the attempt to upload the new content to the website.

A system for applying parental-approval decisions to user-generated content may include a request module programmed to receive, from a child, a request to upload user-generated content to the Internet. The system may include a transmission module programmed to provide the user-generated content to a guardian of the child. The system may further include a response module programmed to receive, from the guardian of the child, a decision indicating whether the user-generated content is allowed to be uploaded to the Internet. The system may include a control module programmed to access the decision of the guardian to the user-generated content and at least one processor configured to execute the request module, the transmission module, the response module, and the control module.

In some embodiments, the request module may include a content-recognition module programmed to detect an attempt to upload user-generated content to a website, and the request module may be further programmed to determine that a guardian of the child has not indicated whether the user-generated content is allowed to be uploaded. The content-recognition module may be programmed to capture transaction information associated with the attempt to upload user-generated content to the website, associate the transaction information with the attempt to upload user-generated content to the website, and apply the decision of the guardian by replaying the transaction information to cause the user-generated content to be uploaded to the website when the decision of the guardian indicates that the user-generated content is allowed to be uploaded.

In certain embodiments, the request module may be programmed to receive a request to pre-authorize the user-generated content for upload to the Internet. In various embodiments, the control module may be programmed to detect an attempt to upload the user-generated content to a website, identify the website on a list of restricted websites, and determine that content cannot be uploaded to the website without approval of the guardian. Additionally or alternatively, the control module may be programmed to detect an attempt to upload the user-generated content to a website and determine that the user-generated content comprises a type of content that is prohibited from being uploaded to the Internet without approval.

A computer-readable-storage medium may include one or more computer-executable instructions that, when executed by at least one processor of a computing device, cause the computing device to: 1) receive, from a child, a request to upload user-generated content to the Internet, 2) provide the user-generated content to a guardian of the child, 3) receive, from the guardian of the child, a decision indicating whether the user-generated content is allowed to be uploaded to the Internet, and 4) apply the decision of the guardian to the user-generated content.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
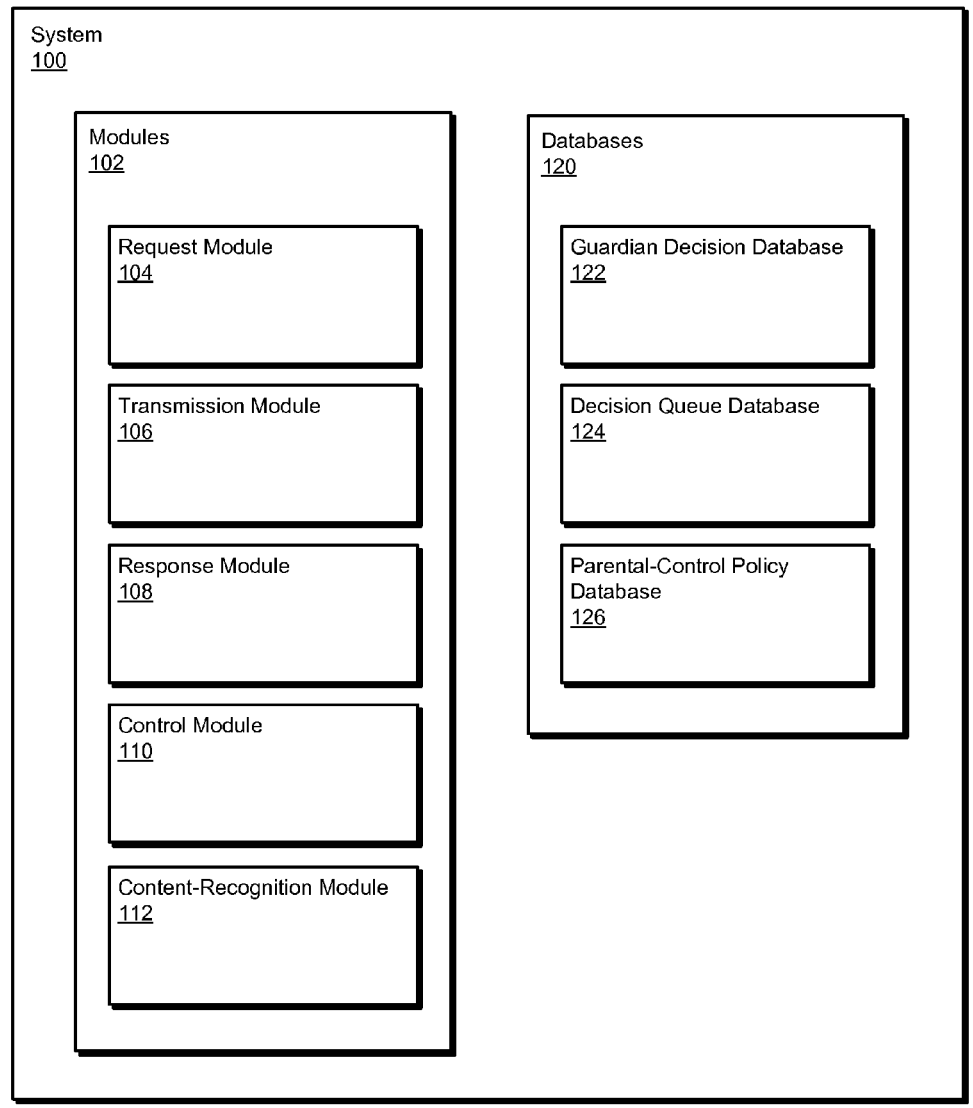
FIG. 1 is a block diagram of an exemplary system for applying parental-approval decisions to user-generated content.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for applying parental-approval decisions to user-generated content. Embodiments of the instant disclosure may provide a workflow for applying parental-control decisions to user-generated content of children. For example, some embodiments may provide an interface for content to be reviewed and approved by a parent prior to being uploaded to the Internet. Content may be identified and reviewed in a variety of contexts. In some embodiments, a child may explicitly request permission for uploading user-generated content. Additionally or alternatively, systems described herein may detect an attempt to upload content that has not been reviewed by a parent, and the content may be sent to the parent for review.

Figure 2:
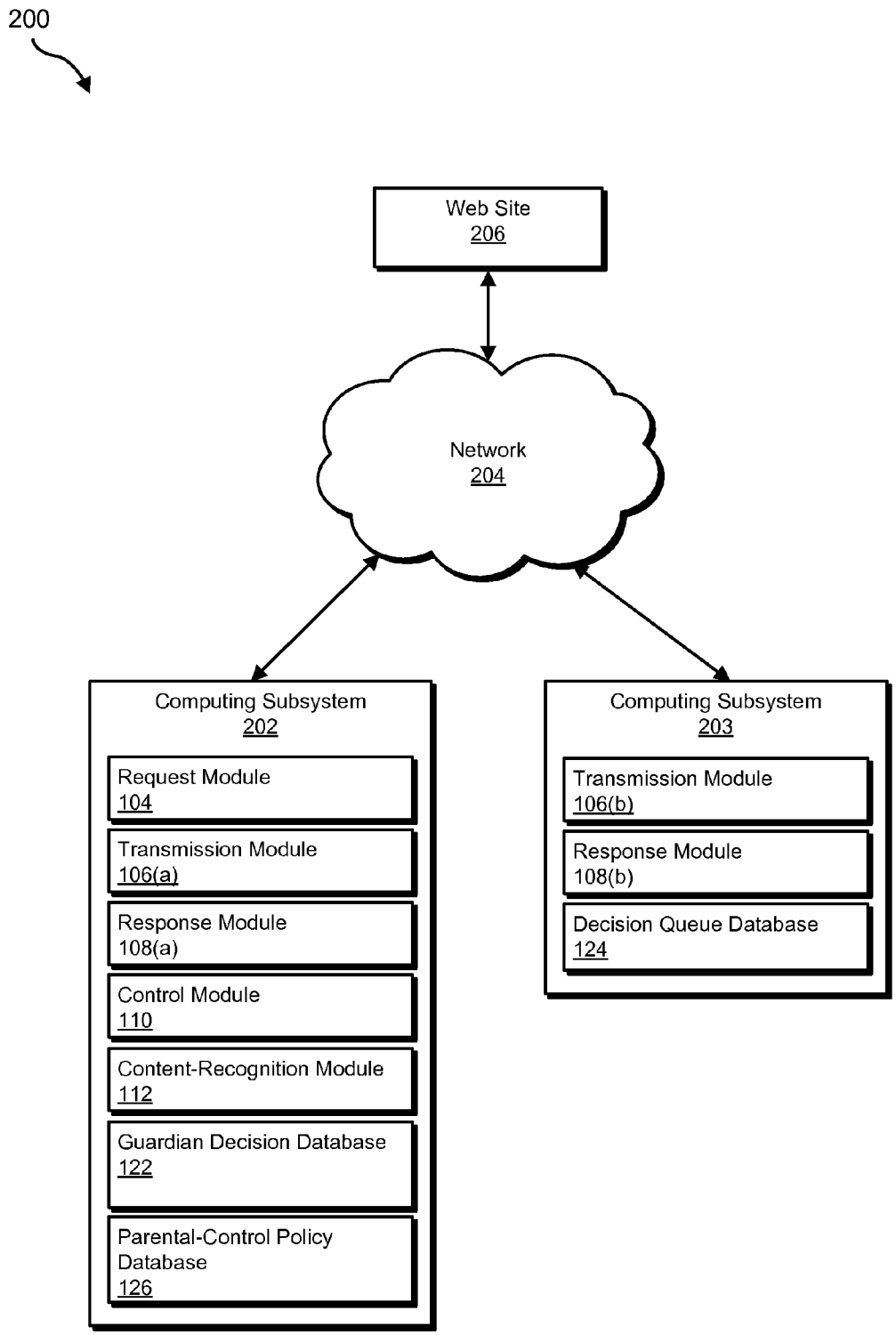
FIG. 2 is a block diagram of an exemplary system for applying parental-approval decisions to user-generated content.

The following will provide, with reference to FIGS. 1-2, detailed descriptions of exemplary systems for applying parental-approval decisions to user-generated content. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for applying parental-approval decisions to user-generated content. As illustrated in this figure, exemplary system 100 may include one or more modules 102 for performing one or more tasks. For example, and as will be explained in greater detail below, exemplary system 100 may include a request module 104 programmed to receive, from a child, a request to upload user-generated content to the Internet. Exemplary system 100 may also include a transmission module 106 programmed to provide the user-generated content to a guardian of the child.

In addition, and as will be described in greater detail below, exemplary system 100 may include a response module 108 programmed to receive, from the guardian of the child, a decision indicating whether the user-generated content is allowed to be uploaded to the Internet. System 100 may further include a control module 110 programmed to apply the decision of the guardian to the user-generated content. System 100 may also include a content-recognition module 112 programmed to detect an attempt to upload user-generated content to a website. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing subsystem 202 and/or 203 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a guardian decision database 122 for associating user-generated content with a decision of a guardian that indicates whether the user-generated content is allowed to be uploaded to the Internet. Exemplary system 100 may also include a decision queue database 124 for storing one or more user-generated content objects that are awaiting review by a guardian. Exemplary system 100 may further include a parental-control policy database 126 for storing one or more parental controls.

Databases 120 in FIG. 1 may represent a portion of one or more computing devices. For example, databases 120 may represent a portion of computing subsystem 202 in FIG. 2, computing subsystem 203 in FIG. 2, and/or portions of exemplary network architecture 700 in FIG. 7. Alternatively, databases 120 in FIG. 1 may represent one or more physically separate devices capable of being accessed by a computing device, such as computing subsystem 202 in FIG. 2, computing subsystem 203 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing subsystem 202, a computing subsystem 203, one or more websites 206, and a network 204. In one embodiment, computing subsystem 202 may include request module 104, transmission module 106(a), response module 108(a), control module 110, content-recognition module 112, guardian decision database 122, and parental-control policy database 126. Computing subsystem 203 may include transmission module 106(b), response module 108(b), and decision queue database 124.

Computing subsystem 202 may include an end-user computing device accessible by a child. As used herein, a "child" may refer to a minor, a dependent, and/or any person subject to parental-control policies. Computing subsystem 204 may include an end-user computing device accessible by a parent. As used herein, a "parent" may refer to any parent, guardian, adult, and/or organization that may apply a parental-control policy to a child. In other embodiments, both a child and a parent may use the same computing device (e.g., either computing subsystem 202 or computing subsystem 203). In such situations, the functionality of each of modules 102 and databases 120 may be provided in a single system.

Computing systems 202 and 203 generally represent any type or form of computing device capable of reading computer-executable instructions. Examples of computing systems 202 and 203 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing subsystem 202 and website 206.

Figure 3:
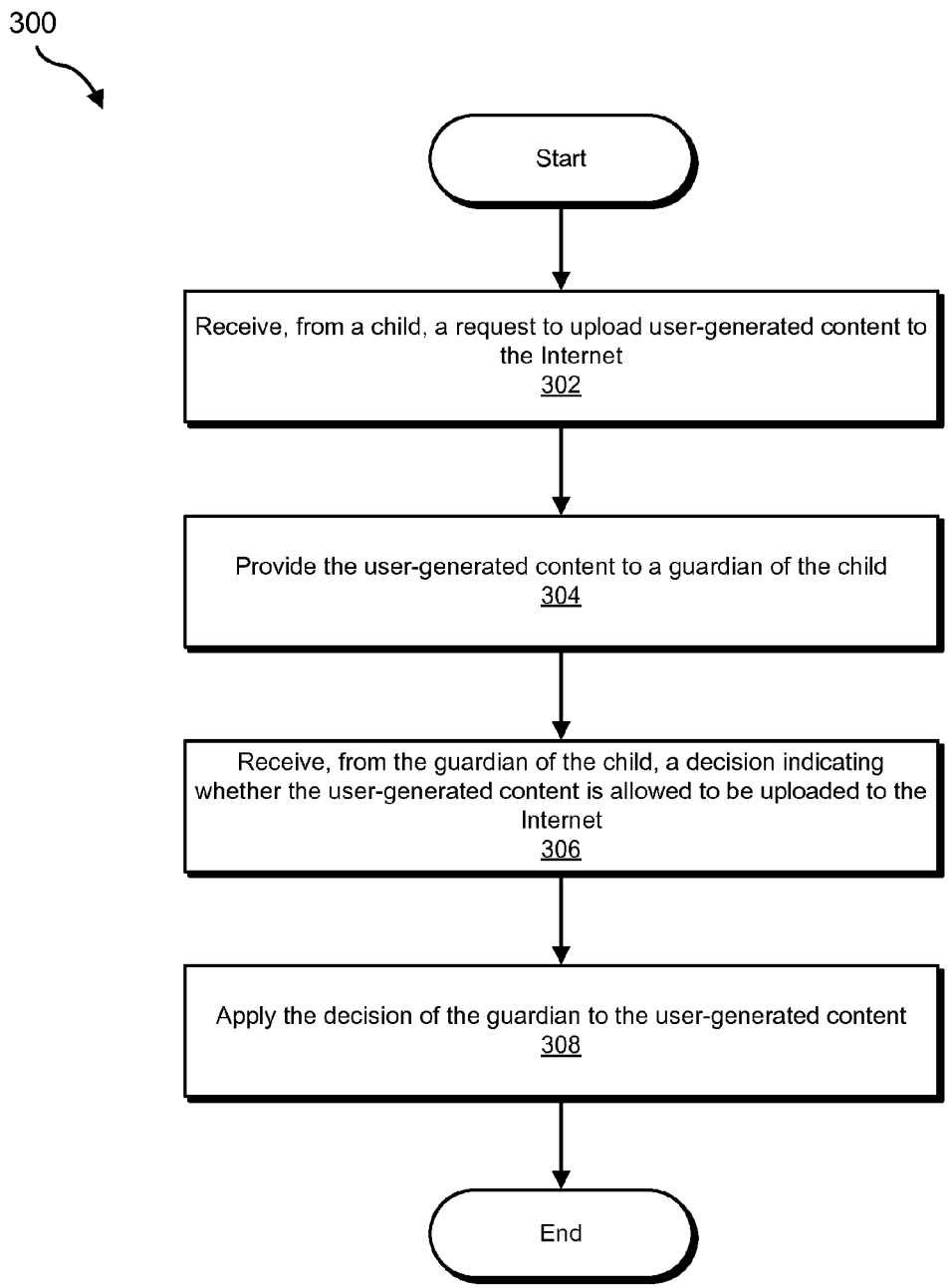
FIG. 3 is a flow diagram of an exemplary method for applying parental-approval decisions to user-generated content.

FIG. 3 is a flow diagram of an exemplary computer-implemented method for applying parental-approval decisions to user-generated content. The steps shown in FIG. 3 may be performed by any suitable computer-executable code and/or computing system. In some embodiments, the steps shown in FIG. 3 may be performed by one or more components of system 100 in FIG. 1 and/or system 200 in FIG. 2. At step 302 in FIG. 3, one or more of the systems described herein may receive, from a child, a request to upload user-generated content to the Internet. For example, request module 104 in FIG. 1 (which may, as detailed above, represent a portion of computing subsystem 202) may receive a request from a child to upload user-generated content to the Internet. Request module 104 may receive the request to upload user-generated content in a variety of contexts. For example, request module 104 may receive a request to upload user-generated content when a child attempts to upload user-generated content to a website (e.g., website 206), as described in greater detail in the discussion corresponding to FIG. 4. Additionally or alternatively, request module 104 may receive the request to upload user-generated content by receiving a request to pre-authorize the user-generated content for upload to the Internet, as described in greater detail in the discussion corresponding to FIG. 5.

A request to upload user-generated content to the Internet may include any request for approval and/or attempt to upload user-generated content to a website or other resource accessible via the Internet. For example, a child using computing subsystem 202 may, through request module 104, request to upload user-generated content through network 204 (e.g., the Internet) to website 206.

At step 304 in FIG. 3, one or more of the systems described herein may provide the user-generated content to a guardian of the child. For example, transmission module 106(a) may transmit the user-generated content to the guardian of the child through transmission module 106(b) on computing subsystem 203. The user-generated content may be provided to the guardian of the child in a variety of ways. For example, transmission module 106(b) may add the user-generated content to a queue of user-generated content to be reviewed by the guardian of the child. In such embodiments, computing subsystem 203 may be a computing device of the parent, such as a mobile phone, a laptop, or a desktop used by the parent. In one example, computing subsystem 203 may include parental-control software used by a parent to manage parental control of the child's activities, and the parental-control software may manage the queue of user-generated content, which may be stored in decision queue database 124. Once the user-generated content is added to the queue, transmission module 106(a) and/or 106(b) may notify the guardian that user-generated content has been added to the queue. For example, the guardian may receive an e-mail, a text message, a pop-up on computing subsystem 203, and/or any other type of notification that user-generated content of the child needs to be reviewed for approval or disapproval.

In some embodiments, transmission module 106(a) may provide the user-generated content to the guardian of the child by e-mailing the content to the guardian of the child, texting the content to the guardian of the child, and/or using any other transmission means to provide the content to the guardian of the child. Additionally or alternatively, in situations where the guardian and the child both use the same computing subsystem (e.g., computing subsystem 202), transmission module 106(a) may provide the user-generated content to the guardian of the child by storing the content locally on computing subsystem 202.

At step 306 in FIG. 3, one or more of these systems described herein may receive, from the guardian of the child, a decision indicating whether the user-generated content is allowed to be uploaded to the Internet. For example, response module 108(b) in FIG. 2, may receive a decision indicating whether the user-generated content of the child is allowed to be uploaded to the Internet and may send the decision to response module 108(a). Response module 108(b) may receive the decision in any suitable manner. For example, a response module 108(b) may receive an indication that the parent allows or prohibits the child from uploading the user-generated content to the Internet through a user interface. In embodiments where the user-generated content was sent to the parent through an e-mail, text message, or other electronic message, the response may be received through a reply message. In such embodiments, response module 108(b) on computing subsystem 203 may be a messaging agent (e.g., an email client), and response module 108(a) on computing subsystem 202 may receive and/or scan the reply message to determine whether the content is allowed to be uploaded.

In some embodiments, a guardian may view each piece of user-generated content pending in decision queue database to 124 and make a decision on each user-generated content object one at a time. Alternatively, the guardian may make a single decision for multiple pieces of user-generated content. For example, the guardian may view several pictures at the same time and indicate that all of the pictures are allowed or prohibited from being uploaded to the Internet.

At step 308 in FIG. 3, one or more of these systems described herein may apply the decision of the guardian to the user-generated content. For example, control module 110 in FIG. 1 (which may, as detailed above, represent a portion of computing subsystem 202 in FIG. 2) may apply the guardian's decision to the child's user-generated content.

Applying the decision of the guardian to the user-generated content may include one or more of a variety of steps. For example, control module 110 may determine whether the web site to which the upload attempt is being made is a website for which content must be reviewed before being uploaded. In other words, control module 110 may apply the decision of the guardian when control module 110 detects an attempt to upload user-generated content to a website, identifies the website on a list of restricted websites, and determines that the content cannot be uploaded to the website without approval of the guardian. A list of restricted websites may identify one or more websites for which content cannot be uploaded unless a guardian approves of the content. For example, the guardian may indicate that the child must obtain approval to upload content to MYSPACE.COM and FACEBOOK.COM, but the child may upload content to WHYVILLE.NET without parental approval.

In some embodiments, the decision of the guardian may be applied to the user-generated content when control module 110 detects an attempt to upload the user-generated content to a website and determines that the user-generated content includes a type of content that is prohibited from being uploaded to the Internet without approval. For example, the parent may indicate that picture files, video files, and/or audio files all require approval before being uploaded to a website. In this example, text files and other types of files may be uploaded without parental approval.

A clever child may attempt to modify the user-generated content after it has been approved by the guardian in an attempt to circumvent the guardian control mechanism. For example, a child may modify a previously approved text file to include text that a guardian probably would not approve of. To protect against this situation, control module 110 may associate the decision of the guardian with a hash of the approved user-generated content. The decision of the guardian may also be associated with one or more other attributes of the user-generated content and stored in guardian decision database 122. Thus, when control module 110 detects an attempt to upload new content to a website, control module 110 may first determine whether content with the same file name or other identifying attribute has been approved or disapproved as indicated in guardian decision database 122. If control module 110 finds a match based on the file name or other identifying characteristic, control module 110 may then compute a hash for the new content and compare the new hash against the hash for the previously approved content identified in the guardian decision database 122. If the hash of the new content does not match the hash of the previously approved user-generated content, control module 110 may block the attempt to upload the new content. On the other hand, if the hash of the new content matches the hash of the previously approved user-generated content, control module 110 may allow the content to be uploaded.

Figure 4:
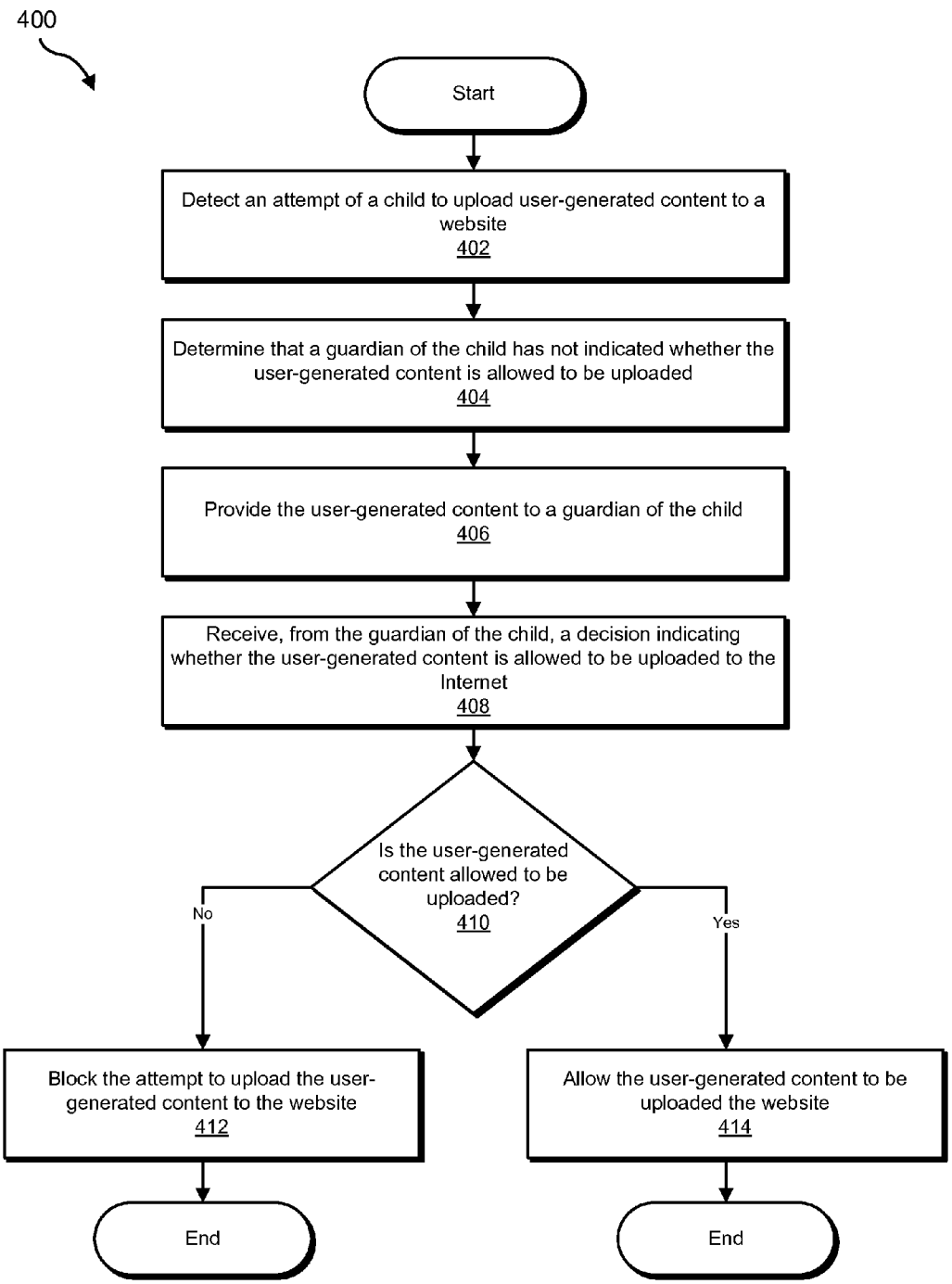
FIG. 4 is another flow diagram of an exemplary method for applying parental-approval decisions to user-generated content.

FIG. 4 is a flow diagram of an exemplary computer-implemented method 400 for applying parental-approval decisions to user-generated content. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 in FIG. 4, one or more of the systems described herein may detect an attempt of a child to upload user-generated content to a website. For example, content-recognition module 112 (which may, as detailed above, represent a portion of computing subsystem 202 in FIG. 2) may detect an attempt of a child to upload user-generated content to a web site. Content-recognition module 112 may detect an attempt to upload user-generated content to a website in any suitable manner. For example, content-recognition module 112 may determine that a web document that a child is interfacing with includes user-generated content that the child is attempting to upload by determining that the web document is located on a website known for user-generated content (e.g., FACEBOOK.COM or BLOGGER.COM). Content-recognition module 112 may determine that the web document is located on a website known for user-generated content by, for instance, parsing the uniform resource locator ("URL") of the web document. For example, if the URL of the web document is http://www.facebook.com/profile.php?ID=123-456-7890, content-recognition module 112 may parse the domain FACEBOOK.COM from the URL and determine that the web document is located on FACEBOOK.COM, a website known for user-generated content.

Content-recognition module 112 may also determine that the web document includes user-generated content by determining that the web document includes a framework for user-generated content (e.g., WORDPRESS or BLOGGER). For example, content-recognition module 112 may parse the web document and determine that the arrangement of the page elements matches a known publishing framework. Additionally or alternatively, content-recognition module 112 may parse the web document and determine that one or more of the page elements matches an element known typically to include user-generated content. In some embodiments, content-recognition module 112 may monitor network traffic and identify any attempt to transfer certain types of files, such as file types indicated by a parent, over network 204.

In some embodiments, content-recognition module 112 may capture transaction information associated with the attempt to upload user-generated content to the website. For example, content-recognition module 112 may store a URL or other identification information for the website to which the attempt was made, may store logon credentials, and/or may store other information related to the process for uploading the user-generated content to the website. Content-recognition module 112 may associate this transaction information with the attempt to upload user-generated content to the website. For example, content-recognition module 112 may send the transaction information along with the request to upload user-generated content to the guardian. Thus, the transaction information may be stored, along with the request, in decision queue database 124. The transaction information may also be associated with the user-generated content in any other suitable manner.

The transaction information may be used when applying the decision of the guardian to the user-generated content. For example, control module 110 may apply the decision of the guardian by replaying the transaction information to cause the user-generated content to be uploaded to the website. Replaying the transaction information may include using the transaction information to identify the website, identifying an upload script associated with the website, and executing the upload script. The upload script may facilitate upload of the user-generated content. For example, the upload script may be a script associated with a particular website, such as MYSPACE.COM, and the script may use transaction information to provide login credentials to MYSPACE.COM and then may post the user-generated content to MYSPACE.COM. Alternatively, rather than being fully automatic, the upload script may facilitate upload of the user-generated content but may request that a child or other user input login credentials or other information. In some embodiments, the child may be prompted to initiate the upload script. For example, the child may receive a response indicating that his/her user-generated content has been approved and may be told to click on a button in parental-control software that starts the upload script and guides the child through a safe upload process.

At step 404 in FIG. 4, one or more of the systems described herein may determine that a guardian of the child has not indicated whether the user-generated content is allowed to be uploaded. For example, control module 110, after detecting the attempt to upload user-generated content to the website, may determine that the user-generated content is not identified in guardian decision database 122. Thus, control module 110 may, at step 406, provide the user-generated content to a guardian of the child. Step 406 is similar to step 304 and therefore the discussion of step 304 applies to step 406.

At step 408, one or more of systems described herein may receive, from the guardian of the child, a decision indicating whether the user-generated content is permitted to be uploaded to the Internet. Step 408 is comparable to step 306 in FIG. 3 and therefore the discussion of step 306 may apply to step 408. If the user-generated content is allowed to be uploaded (decision 410), control module 110 may allow the user-generated content to be uploaded to the website (step 414). Otherwise, control module 110 may block the attempt to upload the user-generated content to the website (step 412).

Figure 5:
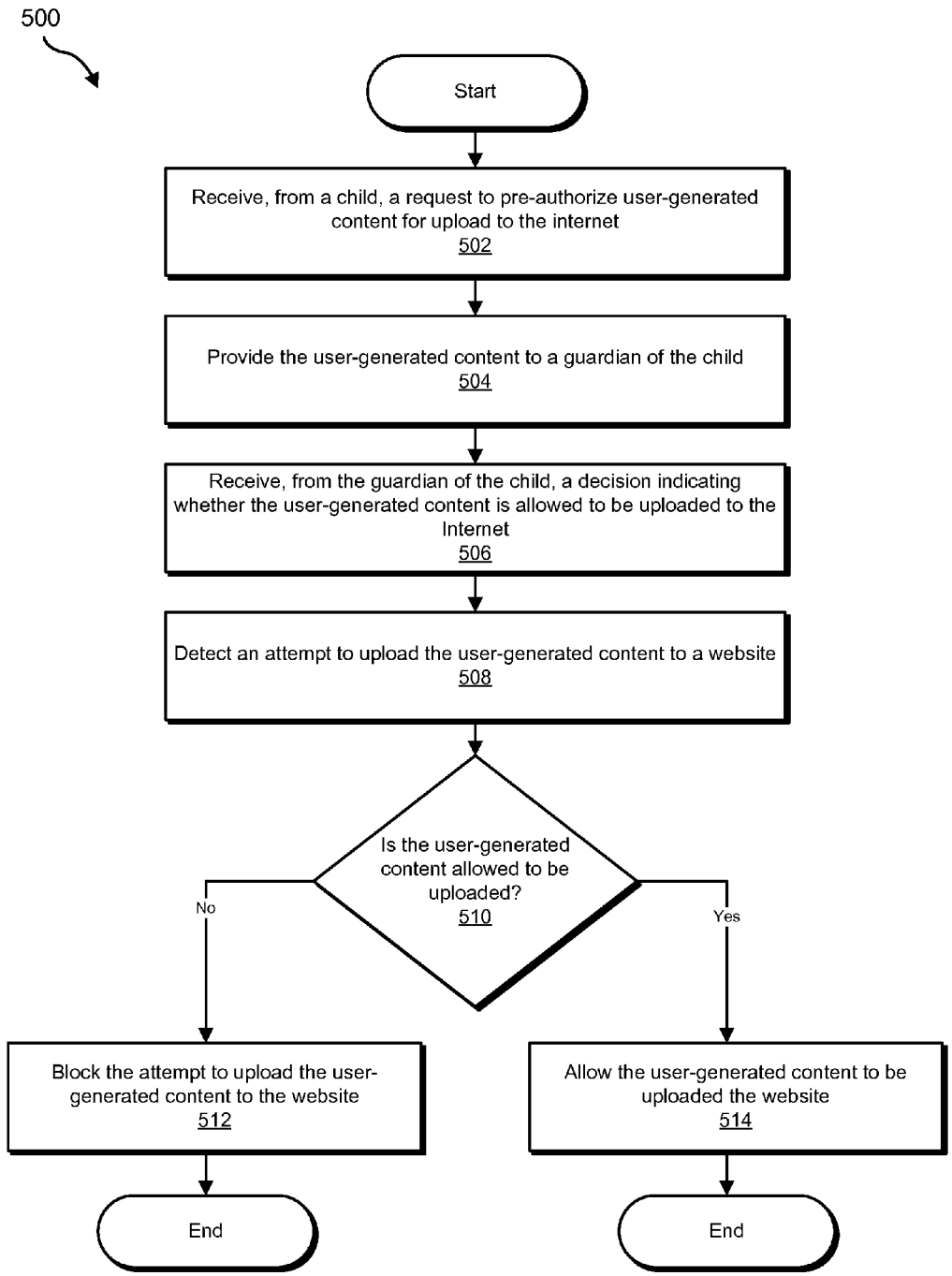
FIG. 5 is another flow diagram of an exemplary method for applying parental-approval decisions to user-generated content.

FIG. 5 is a flow diagram of an exemplary computer-implemented method for applying parental-approval decisions to user-generated content. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

At step 502 in FIG. 5, one or more of the systems described herein may receive, from a child, a request to pre-authorize user-generated content for upload to the Internet. For example, request module 104 in FIG. 1 (which may, as detailed above, represent a portion of computing subsystem 202 in FIG. 2) may receive a request to preauthorize user-generated content for upload to the Internet.

A request to preauthorize user-generated content for upload to the Internet may be received in a variety of ways. For example, request module 104 may be part of parental-control software that allows a child to identify a file for preauthorization for uploading to the Internet. The child may click a button that requests that the user-generated content be approved by a guardian, which may trigger steps 504 and 506 in FIG. 5.

At step 504, one or more of the systems described herein may provide the user-generated content to a guardian of the child, and at step 506, one or more of the systems described herein may receive, from the guardian of the child, a decision indicating whether the user-generated content is allowed to be uploaded to the Internet. Steps 504 and 506 are comparable to steps 304 and 306 in FIG. 3, and therefore the discussion corresponding to steps 304 and 306 applies to steps 504 and 506.

At step 508, control module 110 may detect an attempt to upload the user-generated content to a website, as described in step 402 of FIG. 4. If the user-generated content has been approved for upload (decision 510), control module 110 may allow the user-generated content to be uploaded to the website (step 514). Otherwise, control module 110 may block the attempt to upload the user-generated content to the website (step 512).

Figure 6:
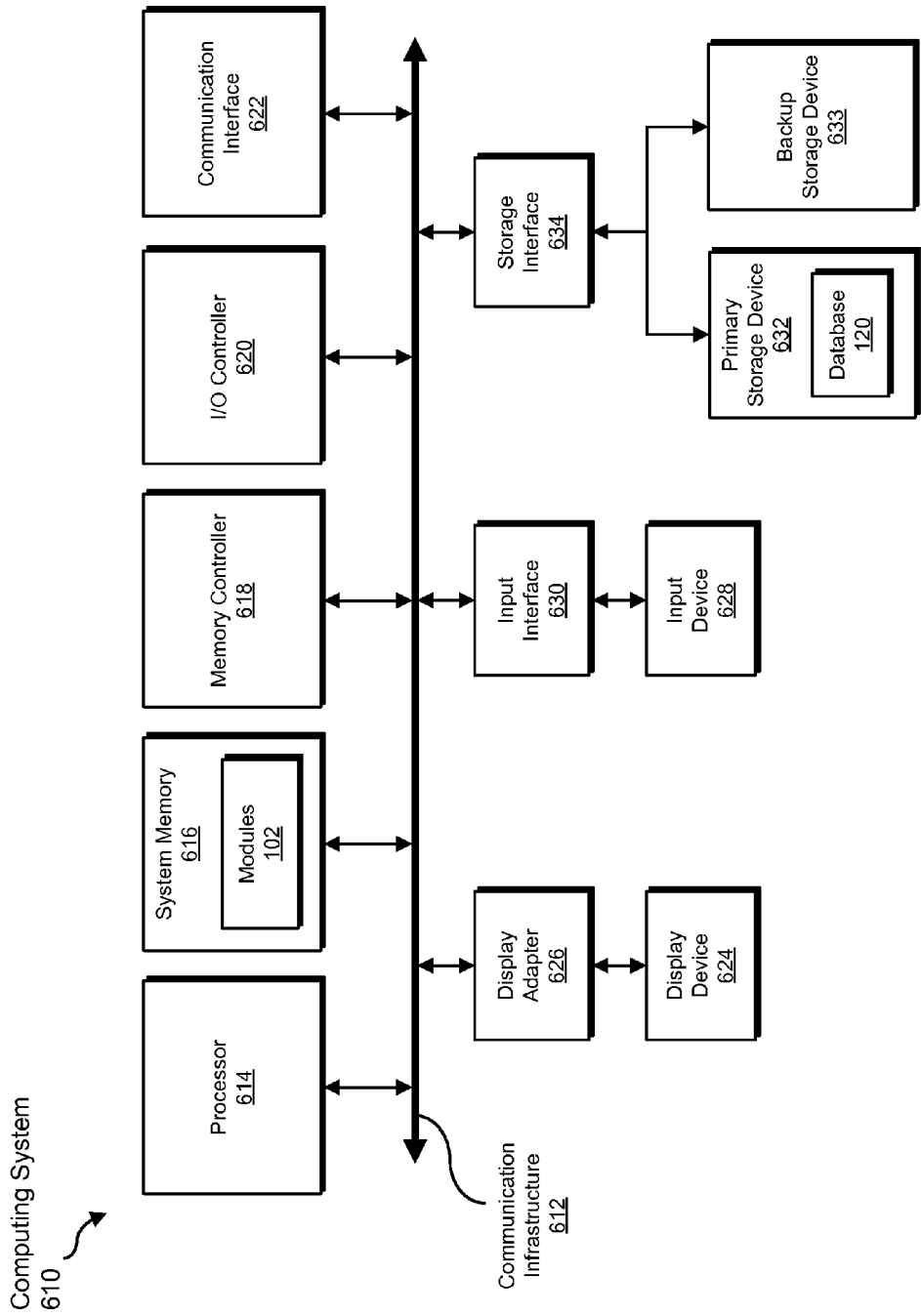
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the associating, adding, identifying, capturing, receiving, providing, applying, detecting, determining, using, executing, prompting, notifying, allowing, and blocking steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as associating, adding, identifying, capturing, receiving, providing, applying, detecting, determining, using, executing, prompting, notifying, allowing, and blocking.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the associating, adding, identifying, capturing, receiving, providing, applying, detecting, determining, using, executing, prompting, notifying, allowing, and blocking steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the associating, adding, identifying, capturing, receiving, providing, applying, detecting, determining, using, executing, prompting, notifying, allowing, and blocking steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the associating, adding, identifying, capturing, receiving, providing, applying, detecting, determining, using, executing, prompting, notifying, allowing, and blocking steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the associating, adding, identifying, capturing, receiving, providing, applying, detecting, determining, using, executing, prompting, notifying, allowing, and blocking steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
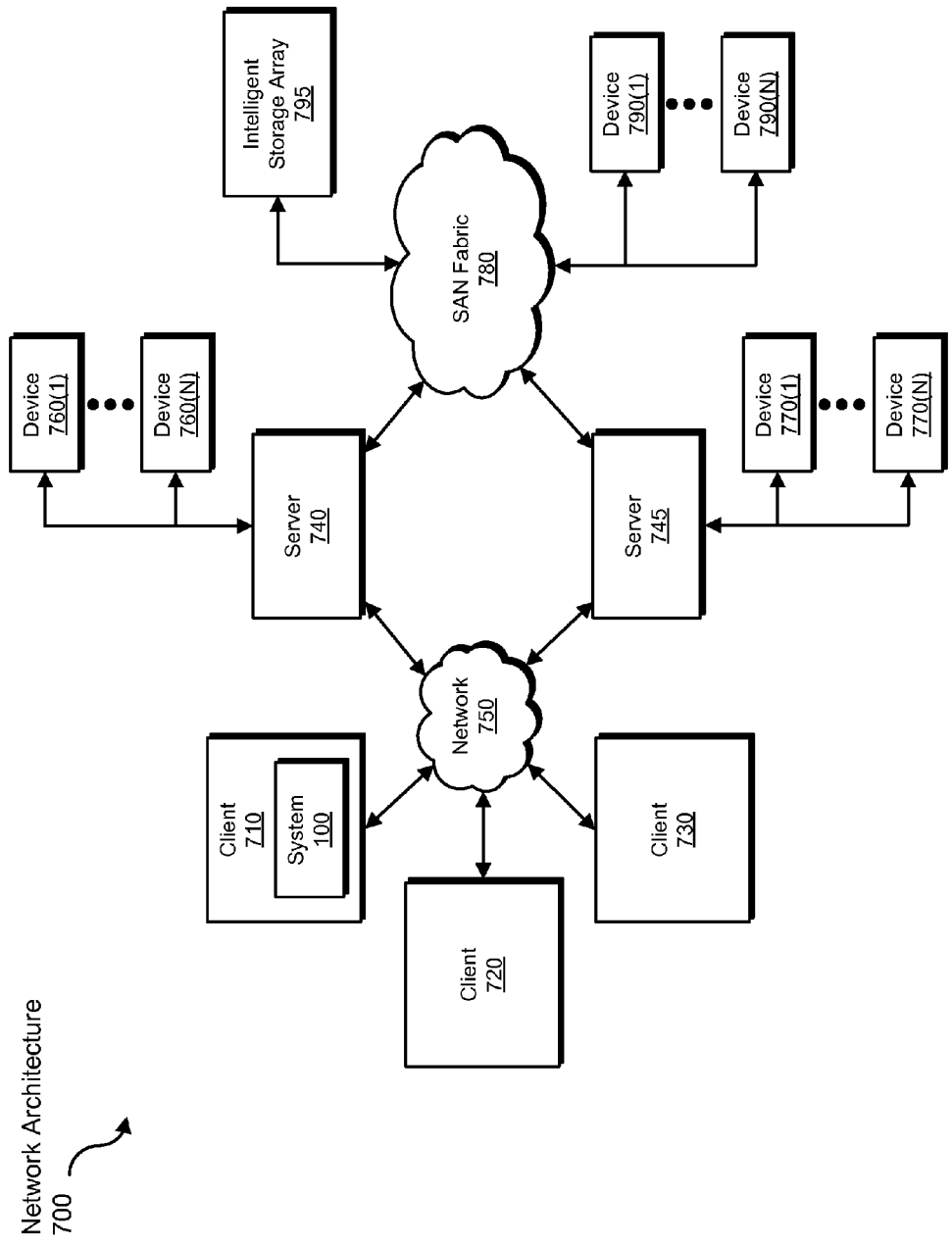
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the associating, adding, identifying, capturing, receiving, providing, applying, detecting, determining, using, executing, prompting, notifying, allowing, and blocking steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for applying parental-approval decisions to user-generated content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, embodiments of the instant disclosure may transform an attempt to upload user-generated content to a website into a request to upload user-generated content to a website.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for applying parental-approval decisions to user-generated content, at least a portion of the method being performed by a computing device comprising at least one processor, the method comprising:
  monitoring network traffic to identify an attempt to upload user-generated content to the Internet, the user-generated content being generated by a child;
  recognizing the user-generated content as content generated by a user by determining that a website to which the child is attempting to upload the user-generated content is known for user-generated content;
  providing the user-generated content from the child to a guardian of the child;
  receiving, from the guardian of the child, a decision indicating whether the user-generated content is allowed to be uploaded to the Internet;
  applying the decision of the guardian to the user-generated content.

2. The computer-implemented method of claim 1, wherein identifying the attempt to upload the user-generated content to the Internet comprises:
  detecting an attempt to upload the user-generated content to the website;
  determining that the guardian of the child has not indicated whether the user-generated content is allowed to be uploaded.

3. The computer-implemented method of claim 2, further comprising:
  capturing transaction information associated with the attempt to upload the user-generated content to the website;
  associating the transaction information with the attempt to upload the user-generated content to the website;
  applying the decision of the guardian by replaying the transaction information to cause the user-generated content to be uploaded to the website, wherein the decision of the guardian indicates that the user-generated content is allowed to be uploaded.

4. The computer-implemented method of claim 3, wherein replaying the transaction information comprises:
  using the transaction information to identify the website;
  identifying an upload script associated with the website;
  executing the upload script, wherein the upload script facilitates upload of the user-generated content.

5. The computer-implemented method of claim 4, wherein applying the decision of the guardian to the user-generated content comprises:
  prompting the child to initiate the upload script, wherein the upload script guides the child through a process of uploading the user-generated content.

6. The computer-implemented method of claim 1, wherein monitoring network traffic to identify the attempt to upload the user-generated content comprises identifying an attempt to transfer a file of a particular file type indicated by the guardian.

7. The computer-implemented method of claim 1, wherein providing the user-generated content to the guardian of the child comprises:
  adding the user-generated content to a queue of user-generated content to be reviewed by the guardian of the child;
  notifying the guardian that the user-generated content has been added to the queue.

8. The computer-implemented method of claim 1, wherein:
  the decision of the guardian indicates that the user-generated content is allowed to be uploaded to the Internet;
  applying the decision of the guardian comprises detecting an attempt to upload the user-generated content to the website and allowing the user-generated content to be uploaded to the website.

9. The method of claim 1, wherein applying the decision of the guardian comprises:
  detecting an attempt to upload the user-generated content to the website;
  identifying the website on a list of restricted websites;
  determining that content cannot be uploaded to the website without approval of the guardian.

10. The method of claim 1, wherein applying the decision of the guardian comprises:
  receiving, from the guardian of the child, an indication of a first type of user-generated content that is prohibited from being uploaded to the Internet without approval of the guardian;
  receiving, from the guardian of the child, an indication of a second type of user-generated content that is allowed to be uploaded to the Internet without approval of the guardian;
  detecting an attempt to upload the user-generated content to the website;
  determining that the user-generated content comprises the first type of user-generated content and is prohibited from being uploaded to the Internet without approval of the guardian.

11. The method of claim 1, wherein applying the decision of the guardian comprises:
  associating the decision of the guardian with a hash of the user-generated content and a filename of the user-generated content, wherein the decision indicates that the user-generated content is approved for upload to the Internet;
  detecting an attempt to upload new content to the website;
  determining that the new content has the same filename as the user-generated content approved for upload to the Internet;
  determining that a hash of the new content does not match the hash of the user-generated content approved by the guardian;
  blocking the attempt to upload the new content to the website.

12. A system for applying parental-approval decisions to user-generated content, the system comprising:
  a content-recognition module programmed to:
    monitor network traffic to identify an attempt to upload user-generated content of a child to the Internet;
    recognize the user-generated content as content generated by a user by determining that a website to which the child is attempting to upload the user-generated content is known for user-generated content;
  a transmission module programmed to provide the user-generated content to a guardian of the child by transmitting the user-generated content from a computing device used by the child to the guardian of the child;
  a response module programmed to receive, from the guardian of the child, a decision indicating whether the user-generated content is allowed to be uploaded to the Internet;
  a control module programmed to apply the decision of the guardian to the user-generated content;
  at least one processor configured to execute the content-recognition module, the transmission module, the response module, and the control module.

13. The system of claim 12, wherein:
the content-recognition module is programmed to detect an attempt to upload the user-generated content to the website;
the content-recognition module is further programmed to determine that the guardian of the child has not indicated whether the user-generated content is allowed to be uploaded.

14. The system of claim 13, wherein the content-recognition module is programmed to:
capture transaction information associated with the attempt to upload the user-generated content to the website;
associate the transaction information with the attempt to upload the user-generated content to the website;
apply the decision of the guardian by replaying the transaction information to cause the user-generated content to be uploaded to the website, wherein the decision of the guardian indicates that the user-generated content is allowed to be uploaded.

15. The system of claim 12, wherein the control module is programmed to:
detect an attempt to upload the user-generated content to the website;
identify the website on a list of restricted websites;
determine that the user-generated content cannot be uploaded to the website without approval of the guardian.

16. The system of claim 12, wherein the control module is programmed to:
detect an attempt to upload the user-generated content to the website;
determine that the user-generated content comprises a type of content that is prohibited from being uploaded to the Internet without approval.

17. A non-transitory computer-readable-storage medium comprising one or more computer-executable instructions that, when executed by at least one processor of a computing device, cause the computing device to:
monitor network traffic to identify an attempt to upload user-generated content generated by a child to the Internet;
recognize the user-generated content as content generated by a user by determining that a website to which the child is attempting to upload the user-generated content is known for user-generated content;
provide the user-generated content to a guardian of the child;
receive, from the guardian of the child, a decision indicating whether the user-generated content is allowed to be uploaded to the Internet;
apply the decision of the guardian to the user-generated content.

18. The system of claim 12, wherein the content-recognition module is programmed to determine that the website to which the child is attempting to upload the user-generated content is known for user-generated content by:
parsing a uniform resource locator of the website to identify a domain within the uniform resource locator;
determining that the domain is known for hosting user-generated content.

19. The system of claim 12, wherein:
a web document with which the child is interfacing includes the user-generated content that the child is attempting to upload to the website;
the content-recognition module is programmed to determine that the website to which the child is attempting to upload the user-generated content is known for user-generated content by determining that the web document includes a framework for publishing user-generated content.

* * * * *